(No Model.) 3 Sheets—Sheet 1.

A. MONKIEWICZ.
GEARING FOR BICYCLES.

No. 573,230. Patented Dec. 15, 1896.

Witnesses:
A. R. Appleman
A. M. Wilson

Inventor:
Alexander Monkiewicz
By Henry C. Evert
Att'y.

(No Model.) 3 Sheets—Sheet 2.

A. MONKIEWICZ.
GEARING FOR BICYCLES.

No. 573,230. Patented Dec. 15, 1896.

Witnesses:
A. R. Appleman Jr.
A. M. Wilson

Inventor:
Alexander Monkiewicz
By Henry C. Evert
Atty.

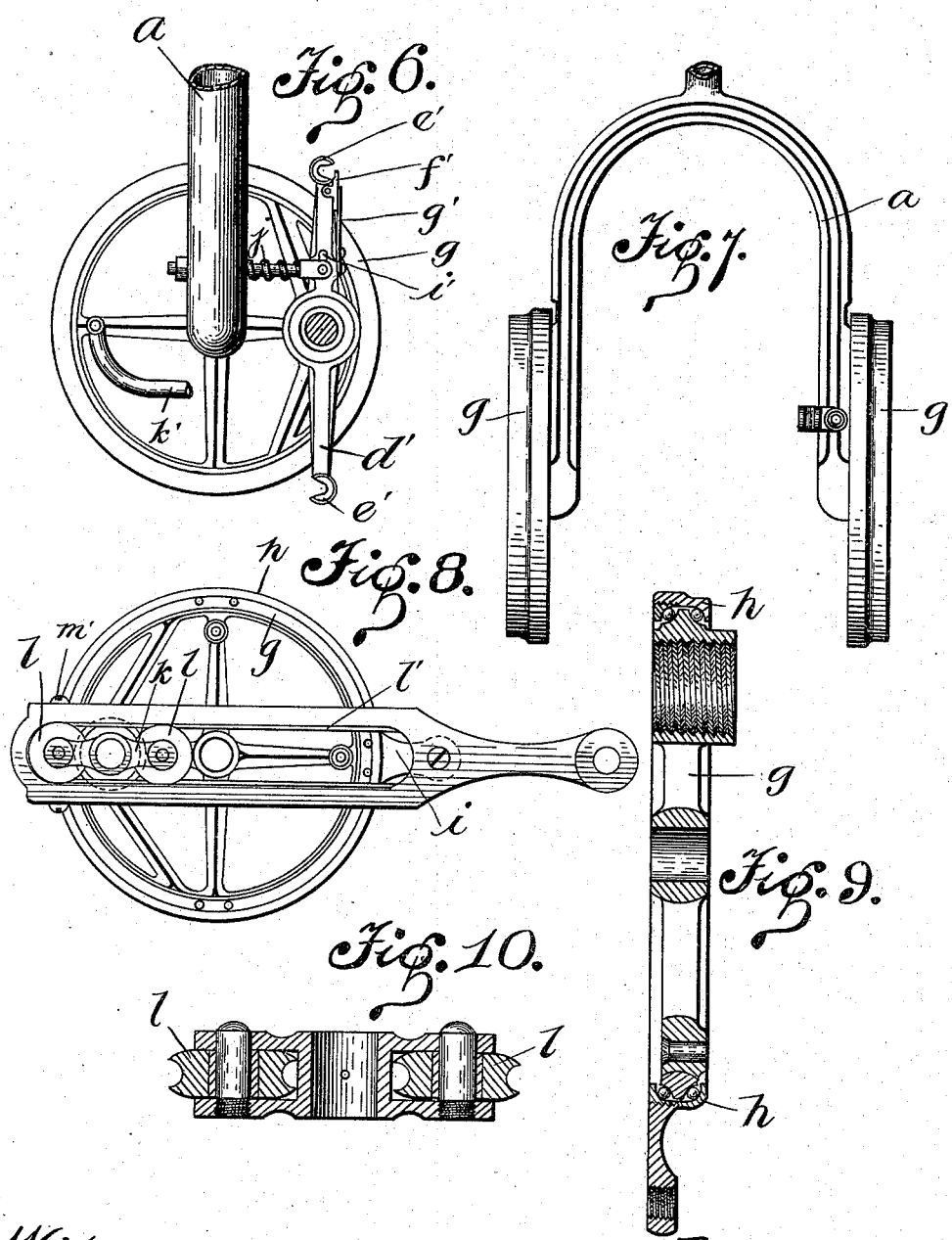

UNITED STATES PATENT OFFICE.

ALEXANDER MONKIEWICZ, OF PITTSBURG, PENNSYLVANIA.

GEARING FOR BICYCLES.

SPECIFICATION forming part of Letters Patent No. 573,230, dated December 15, 1896.

Application filed February 20, 1896. Serial No. 580,045. (No model.)

*To all whom it may concern:*

Be it known that I, ALEXANDER MONKIEWICZ, a citizen of the United States of America, residing at Pittsburg, in the county of Allegheny and State of Pennsylvania, have invented certain new and useful Improvements in Gearing for Bicycles, of which the following is a specification, reference being had therein to the accompanying drawings.

This invention relates to certain new and useful improvements in gearing for bicycles, and has for its object the provision of new and novel means whereby the speed of the bicycle may be greatly increased without requiring any additional motive power; furthermore, that will relieve the strain upon the legs of the rider by the reason of a shorter backward movement of the foot being required than in the ordinary construction.

A further object of the invention is to construct a bicycle as above described, whereby the gear of the machine may be easily and quickly made, changing the same from a high to a low gear, or vice versa, as may be required, while the machine is in motion.

A still further object of the invention is to construct a bicycle of the above-referred-to class and possessing the above-named advantages without adding but little to the weight of the same; furthermore, that will be extremely simple in its construction, strong, durable, effectual in its operation, and comparatively inexpensive to manufacture.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
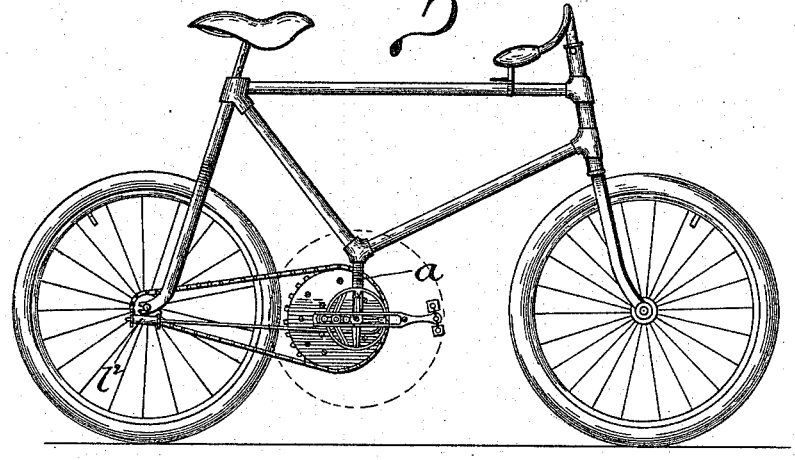
Figure 2:
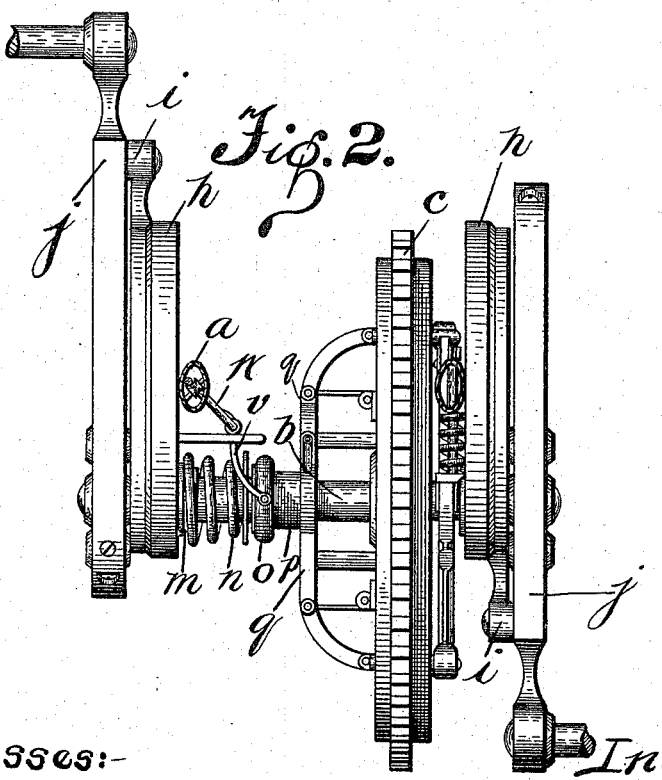
Figure 3:
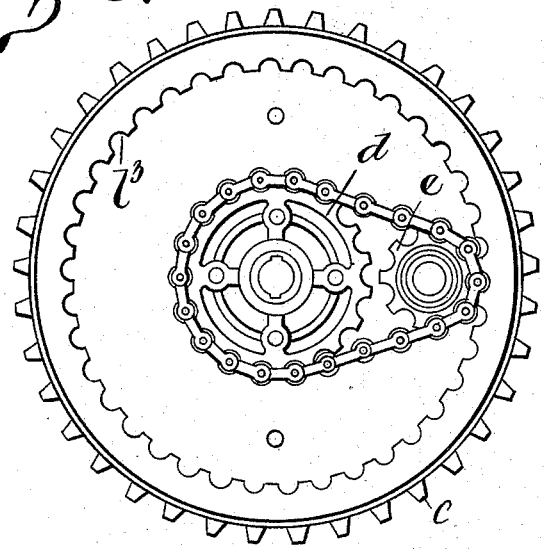
Figure 4:
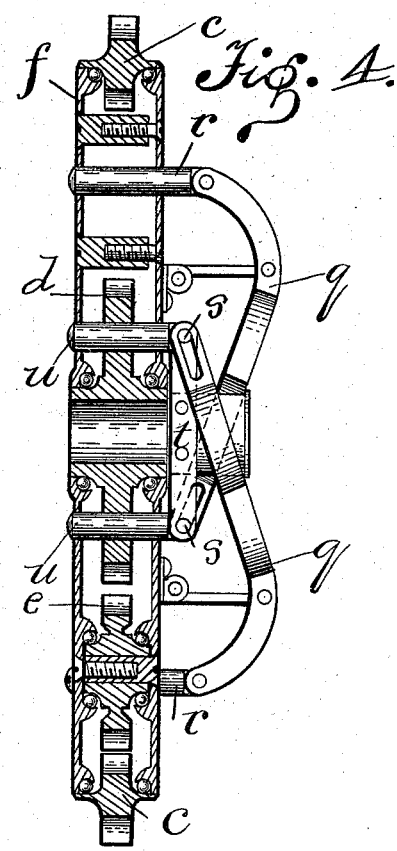
Figure 5:
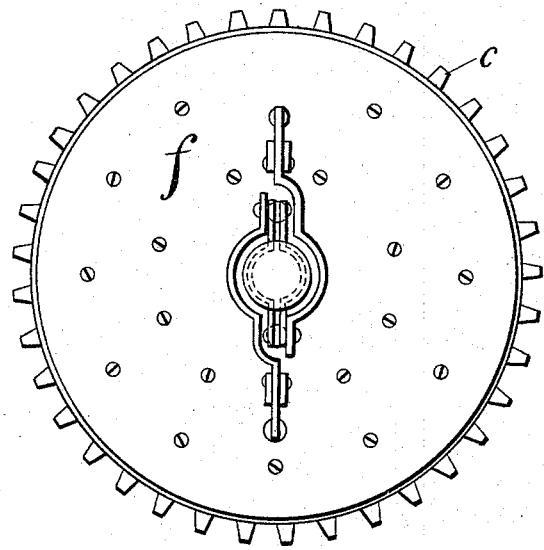
Figure 11:
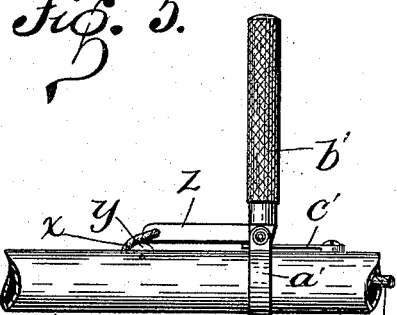

Figure 1 is a side view of a bicycle equipped with my improvement. Fig. 2 is a top plan view of the crank-hanger and cranks, showing my improved device in position. Fig. 3 is a side elevation of the sprocket-wheels. Fig. 4 is a transverse vertical sectional view of the sprocket-wheels, showing the lever-arms. Fig. 5 is a side elevation of the main sprocket-wheel, showing the lever-arms. Fig. 6 is a side elevation of the eccentric-wheel, showing catch-lever. Fig. 7 is a front elevation of eccentric-wheels, showing truss portion of frame. Fig. 8 is a side elevation of the eccentric and crank. Fig. 9 is a transverse vertical sectional view of the eccentric and revolving collar. Fig. 10 is a longitudinal sectional view of the bearing-wheels in the crank. Fig. 11 is a side elevation of the shifting-lever.

In the drawings, $a$ represents the truss portion of the frame, which supports the crank-shaft $b$. On this crank-shaft $b$ is secured the main sprocket-wheel $c$, inside of which is secured to the crank-shaft a sprocket-wheel $d$. A sprocket-wheel $e$ is also secured within this main wheel and a sprocket-chain operates on these two wheels. Plates $ff$ are provided on the sides of the main sprocket-wheels, which may be secured to the wheel by screws, as shown, which will keep the dirt out of the working parts secured therein.

Near each end of the crank-hanger is secured an eccentric-wheel $g$, which is provided with a revolving collar $h$, encircling the same. This collar is provided with an arm $i$, which is secured to the crank $j$. This crank $j$ is slotted in the body portion, and secured to the end of the shaft by an arm $k$ are bearing-wheels $l$, which are grooved on their bearing-surface to engage the track $l'$, provided for the same in the cranks. These bearing-surfaces $l'$ are inserted in the crank along the edge of the slot and are formed round, so as to conform with the grooves in the wheels $l$, and are secured in their position by small screws or pins $m'$. To the eccentric-wheel is secured a collar $m$, which retains one end of a coiled spring $n$, and the other end of this spring engages the collar $o$ of the barrel $p$, which is secured to the arms $q$. These arms $q$ are secured to the barrel and carry in their outer ends pins $r\ r$. The inner ends of these arms are slotted and secured to a pin $s$ at the ends of the journal-bar $t$, which carries pins $u$, passing through the main sprocket-wheel in a similar manner to the pins $r\ r$ and engages in the wheel $d$. To the collar $o$ is pivotally secured a lever-rod $v$, which is connected to a link $w$, the upper ends of which extend into one of the truss portions and is connected to a rod or cord $x$, extending upward through the frame and out through the top bar of the frame to any suitable point that may be desired. This cord or rod extends out through the top of the top bar of the frame and passes over a pulley $y$, secured in the frame, and is secured to an arm $z$. This arm $z$ is pivotally secured in a band $a'$, which is fastened to the top of the frame, and has also secured thereto a lever $b'$ for operating the cord or rod $x$. A short distance behind this band is secured a spring $c'$, which engages under the pivoted end of the bar $z$ and retains the operating-handle in an upright position.

The eccentric-wheels $g$ are rigidly secured to the truss-frame $a$, and on the crank-hanger is provided a catch-lever $d'$, having a hook $e'$ on each end, which engages in the pins $r\ r$. Near one of these hooks is secured a pivoted latch $f'$, which is retained in its normal position by a spring $g'$, secured to the catch-lever, as shown in Fig. 6 of the drawings. A bolt $h'$ is secured to this lever and operates in a slot $i'$, and the other end of this bolt $h'$ extends through the truss and is provided on this end with a nut, and a coiled spring $j'$ is provided on the bolt between the truss and the catch-lever, which returns the catch-lever to its normal position after it engages in the pins $r\ r$.

The brace-rods $k'$ are secured to the elliptical wheel and at the hub of the rear wheel, where they are provided with a set-screw adjustment $l^2$ for tightening or loosening the chain, as may be desired.

All the bearing parts of the main sprocket-wheels are provided with ball-bearings, as is fully shown in Fig. 4, and ball-bearings are provided between the eccentric-wheel and the collar thereof to allow the same to move free and easily.

We will assume now, for the purpose of illustration of the operation of my improved gearing, that the parts have been secured in their respective positions in the manner shown and that the lever $b'$ is in its normal position. The arms $q\ q$ will then be in the position shown in Fig. 4 of the drawings, the pins $r\ r$ being out of engagement with the catch-lever $d'$ and the pins $u\ u$ being in engagement with the sprocket-wheel $d$. The machine will then be in the high gear, and as the main sprocket-chain drives the main sprocket-wheel the pins $u\ u$ will revolve the sprocket-wheel $d$, and the chain working over this wheel and the wheel $e$ will engage in the cogs $l^3$, the wheels revolving in unison.

When it is desired to reduce the gear of the machine, the lever $b'$ is pushed from the rider, thus operating the lever-arm $z$, raising the same to the upright position formerly occupied by the lever $b'$, and, through the medium of the pull thus caused on the cord or rope $x$, operating the lever-arm $v$, secured to the collar $o$, and bringing the arms $q\ q$ to the position shown in Fig. 2 of the drawings, which will force the pins $r\ r$ out past the face of the sprocket-wheel $c$, where they will engage in the catch-lever $d'$ and at the same time withdraw the pins $u\ u$ from engagement with the sprocket-wheel $d$. As the catch-lever engages the pins $r\ r$ the spring-catch of the lever will retain the same in this position, and the coil-spring $j'$ will return the catch-lever to its normal position from which it would move slightly while engaging on the pins $r\ r$. The machine will then be provided with a double gear for driving the same without any additional motive power for operating, as the gear will be necessarily reduced by this operation, which makes the same easy to operate while climbing hills or on rough roads and the like.

By the construction of the cranks, and secured to the collar of the eccentric-wheels, it will be noted that as the operator is pressing forward on the cranks they will be extended to the full length, thus giving the most power obtainable from the same. As the pedal on the end of the crank passes the point of pressure the eccentric-wheel will cause the crank to ride up on the bearing-wheels $l$, giving a short backward stroke to the crank, the same being but about one-half the distance as the forward stroke, giving a much lighter pull and relieving the strain on the legs of the rider by reason of the shorter backward stroke, there not being as large a circle required.

The advantage of my improved gearing will be readily apparent, as the gear may be easily changed from a high to a low speed without checking the speed at which the wheel is going, making the use of the same invaluable for roads having heavy grades or that are rough and uneven. It will also be observed that my improved gearing and crank may be readily applied to various other machines than on a bicycle, on which it will be found useful as well. It will also be noted that various changes may be made in the details of construction without departing from the general spirit of my invention.

Having fully described my invention, what I claim as new, and desire to secure by Letters Patent, is—

1. In a gear for bicycles, a barrel on the crank-shaft provided on one end with a collar and the other end secured to journaled arms, the outer ends of said arms carrying pins protruding through the main sprocket-wheel and the inner ends being slotted and secured to a journaled plate or arm carrying pins protruding through the main and inner center sprocket, substantially as shown and described.

2. In a bicycle-gear, a truss-frame having the main sprocket-wheel arranged on the crank-shaft within said truss, a barrel on the crank-shaft secured to arms carrying pins protruding through the sprocket-wheel, the inner pins engaging the sprocket and central gear-wheels, and the outer pins on said arms being adapted to engage a catch-lever journaled on the shaft and retained in position by a bolt secured thereto, and to the truss-frame, said bolt being provided with a coiled spring, and the catch-lever having a spring-latch at one end, substantially as shown and described.

In testimony whereof I affix my signature in presence of two witnesses.

ALEXANDER MONKIEWICZ.

Witnesses:
H. C. EVERT,
F. J. KWIATKOWSKI.